United States Patent
Grunwald et al.

[15] 3,657,023
[45] Apr. 18, 1972

[54] COMPOSITION FOR BLACKENING COPPER

[72] Inventors: John J. Grunwald, 150 Roydon Road, New Haven, Conn. 06511; Edmund E. Horner, 105 Crestview Drive, Watertown, Conn. 06795

[22] Filed: May 15, 1970

[21] Appl. No.: 48,766

[52] U.S. Cl. ........................................148/6.15 R, 252/416
[51] Int. Cl. ..................................................C23f 7/12
[58] Field of Search......................148/6.15 R, 6.14; 252/416

[56] References Cited

UNITED STATES PATENTS 2,481,854   9/1949   MacMahon...........................148/6.14
2,817,610   12/1957  Newell...................................148/6.14
3,279,957   10/1966  Fink........................................148/6.14

Primary Examiner—Ralph S. Kendall
Attorney—Steward & Steward, Merrill F. Steward, Donald T. Steward and Walter D. Hunter

[57] ABSTRACT

Novel blackening compositions comprising a peroxydiphosphate compound and an alkali metal hydroxide are utilized to produce on copper surfaces a soft, velvet-black coating which can be mechanically rubbed to form a smooth, black finish. The coating process is carried out by immersing the copper article in the aqueous blackening bath at a temperature of about 150° to about 210° F. for about 3 to about 30 minutes.

19 Claims, No Drawings

COMPOSITION FOR BLACKENING COPPER

This invention relates to compositions useful for producing colored coatings. More particularly this invention relates to compositions comprising a peroxydiphosphate compound and sodium or potassium hydroxide and to a process in which such novel compositions are utilized in blackening copper metal, copper plate or copper-rich alloys, such as brass and bronze. The novel blackening compositions of this invention produce a soft, velvet-black finish on the copper surface which may be mechanically rubbed to form a smooth, black finish.

The blackening of copper is an important metal finishing operation which is carried out for a variety of purposes such as for aesthetic appeal, to reduce light reflection in optical devices as exemplified by range finders, periscopes, binoculars, etc., having copper or copper alloy elements which unless coated in a suitable manner may generate undesirable secondary reflections, shadow images, etc. Copper and copper alloy surfaces are also sometimes blackened to form a suitable undercoat for subsequent organic coating and to improve the adhesion of sheet copper employed in preparing copper-clad, fiber-glass, epoxy laminates.

The blackening of copper surfaces with aqueous alkaline solutions of either ammonium persulfate, potassium chlorite, or sodium sulfide has been disclosed in a number of processes known in the art. While each of these oxidizing baths will blacken copper, they all suffer from one or more serious disadvantages. For example, alkaline solutions of sodium, potassium or ammonium persulfates are very unsatisfactory because the persulfates themselves are unstable and the life of the solution is relatively short, i.e., usually less than about eight hours. Blackening baths employing sulfides such as sodium or ammonium sulfide or other water-soluble sulfides have not been found to be satisfactory blackening agents since the coating formed has relatively poor adhesion. Further, such sulfide films are unstable when exposed to outside atmospheres and thus must be protected by an organic coating, such as a lacquer or a wax, which must be renewed from time to time. The use of potassium chlorite or sodium chlorite in preparing blackening compositions presents a manufacturing hazard in that these materials, that is the chlorites themselves, must be stored in restricted areas since such compositions are explosive upon percussion in the presence of organic matter and when brought into contact with organic material such as fabric, wood, paper, etc., there is a definite fire hazard. Also, the chlorites when exposed to acids are known to produce noxious fumes of chlorine dioxide in dangerous amounts.

The novel compositions of this invention comprise a mixture of a peroxydiphosphate compound, such as potassium peroxydiphosphate (i.e., $K_4P_2O_8$) together with sodium or potassium hydroxide. Useful peroxydiphosphate compounds include ammonium peroxydiphosphate; the alkali metal peroxydiphosphates, such as sodium, potassium and lithium peroxydiphosphates; the alkaline earth metal peroxydiphosphates such as the calcium and magnesium salts, and mixtures thereof. Preferably, the compositions are formulated as pulverulent mixtures. Such compositions, when dissolved in a suitable amount of water, form solutions which are particularly useful for coloring copper or copper alloy surfaces a deep black.

In contrast to the instability of the alkaline baths set forth in the art, the novel bath compositions of this invention are stable over long periods of time and the coatings formed on copper and copper alloys give long lasting and excellent protection against atmospheric and other influences.

Although an aqueous solution of a peroxydiphosphate compound, such as potassium peroxydiphosphate, will not blacken copper even when the concentration of the phosphate is as much as 120 grams per liter, surprisingly, it has been found that the novel compositions of this invention which include an alkali metal hydroxide, such as potassium or sodium hydroxide, will yield a solution which will blacken copper metal, copper plate or copper alloys and impart a velvet black-brown coating on berrylium copper. Further, mechanically rubbing of the black-brown coating will yield a smooth, black, adherent finish.

The novel dry compositions of this invention can be formulated, for example, by simply mixing powdered or flaked anhydrous sodium hydroxide or potassium hydroxide with the powdered peroxydiphosphate compound. Any suitable mixing device such as an ordinary mixing drum employed for admixing a fine powder is suitable for preparing the novel dry compositions of this invention. Since sodium hydroxide and potassium hydroxide are hydroscopic materials, preferably the mixing operation is carried out in a dry atmosphere and the mixed, prepared dry composition is also preferably kept out of contact with moisture in order to avoid any tendency toward caking after the powder has been formulated.

The novel dry blackening compositions of this invention preferably will contain from about 7.7 to about 66.7 weight percent of the peroxydiphosphate compound with the balance being sodium hydroxide or potassium hydroxide. In employing the dry blackening compositions to prepare the aqueous blackening baths or solutions a sufficient quantity of the dry composition is mixed with water to yield a blackening bath containing from about 5 to about 120 grams per liter of the peroxydiphosphate compound and from about 60 to about 120 grams per liter of sodium or potassium hydroxide. The water employed in preparing the blackening bath compositions may or may not be preheated before the dry composition is dissolved and the solution may be agitated during the mixing operation, if desired.

The solutions utilized in the copper blackening process of this invention need not necessarily be prepared from a previously constituted mixture of the peroxydiphosphate compound and an alkali metal hydroxide since the individual ingredients, i.e., the peroxydiphosphate and the alkali metal hydroxide may be added separately, if desired, to a quantity of water in order to form the blackening bath solution. The use of the novel dry compositions of this invention in preparing the blackening bath or solution does, however, offer a number of distinct advantages especially with regard to handling and shipping.

Generally, the blackening process of this invention is operated with the bath temperature maintained between about 150° to about 210° F. and preferably from about 165° to about 205° F. It has been found that the temperature required for the blackening operation varies somewhat with the concentration of the chemicals in the bath in that at higher chemical concentrations lower temperatures may be employed. In a like manner, the coating developed, which may range from a smooth, dull black to a velvet black, is influenced by the operating variables such as the time of immersion of the copper or copper alloy surface in the bath, the temperature of the bath and the concentration of chemicals in the bath itself. The immersion time in the bath required to develop a satisfactory black coating on the surface of the copper or copper alloy being treated, generally can be varied over a wide range and usually will be from about 3 to about 30 minutes or more depending upon the other operating conditions.

Prior to immersing the surface of the copper or copper alloy article in the aqueous blackening bath of this invention, it has been found highly advantageous to first subject the copper article to a soaking action in any of the conventionally employed alkaline cleaning baths, followed by an acid dip. The aqueous alkaline cleaning bath can be, for example, an admixture of trisodium phosphate, sodium carbonate and an alkaline-stable surfactant to facilitate wetting of the surface or any of the other numerous alkaline cleaning compositions well known in the art can be employed. In the second step of the cleaning operation the acid dip employed can be, for example, sulfuric acid, nitric acid, sulfuric acid-nitric acid bright dip, chromic acid bright dip, etc. Preferably, after the alkaline cleaning step and subsequent to the acid treatment step, the article is thoroughly washed with cold water.

The copper blackening process of this invention comprises the following steps:
1. subjecting the surface of the copper or copper alloy article to the action of an alkaline cleaning solution,
2. rinsing the article in cold water,
3. immersing the article in an acid dip, 4. rinsing the article in cold water,
5. blackening the surface of the article thus cleaned by immersing it in a hot aqueous solution of the peroxidiphosphate compound and an alkali metal hydroxide,
6. rinsing the blackened article in cold water followed by rinsing in hot water, and
7. drying the thus-blackened article.

The drying of the blackened copper surface may be accomplished in a variety of ways well known in the art such as, for example, by passing the articles on a conveyor through a tunnel drier maintained at a temperature of about 150° F.; or the blackened articles after being rinsed with hot water may be allowed to dry at room temperature under ambient conditions.

The coatings imparted to copper surfaces utilizing the process of this invention may vary from a smooth, dull black to a velvet black depending on the operating conditions. The velvet black coatings developed may be readily brushed to a smooth finish and while the velvet is readily wiped smooth, it is very adherent.

The following examples illustrate various embodiments of this invention but are to be considered not limitative:

EXAMPLE I

A blackening solution was prepared by mixing sufficient finely divided potassium peroxydiphosphate and sodium hydroxide with water to give a final solution containing about 120 grams per liter of potassium peroxydiphosphate and 60 grams per liter of sodium hydroxide. The mixing temperature was about 150° F.

A copper sheet was cleaned by first soaking it in an alkaline cleaning solution, rinsing with cold water and then immersing it in an acid dip followed by a final cold water rinse. The clean copper sheet was immersed in the blackening solution previously prepared for 5 minutes at a temperature of about 195° F. On removal from the blackening bath, the copper sheet possessed a uniform, adherent, velvet black coating on its surfaces. After the sheet had been subjected to a cold water rinse, followed by a hot water rinse, it was then allowed to dry at room temperature. The coating was wiped smooth yielding a copper sheet having an adherent smooth, dull, black finish.

EXAMPLES II–XVI

A number of additional copper sheet specimens were blackened using the same procedure as employed in Example I. In each instance the black coating imparted to the copper specimens was uniform and adherent and was readily brushed to a smooth, dull, black finish. Pertinent details relating to these examples are found in Table 1 which follows:

TABLE 1

| Example No. | II | III | IV | $V_a$ | $VI_a$ | VII |
|---|---|---|---|---|---|---|
| Blackening Solution | | | | | | |
| $K_4P_2O_8$ | 120 | 60 | 60 | 120 | 120 | 30 |
| NaOH (g./l.) | — | 60 | — | 120 | — | 60 |
| KOH (g./l.) | 60 | — | 60 | — | 120 | — |
| Temperature (°F.) | 180 | 180 | 180 | 180 | 180 | 180 |
| Immersion Time (min.) | 5 | 5 | 5 | 5 | 5 | 5 |

| Example No. | VIII | IX | X | XI | XII |
|---|---|---|---|---|---|
| Blackening Solution | | | | | |
| $K_4P_2O_8$ (g./l.) | 30 | 15 | 15 | 5 | 5 |
| NaOH (g./l.) | — | 60 | — | 60 | — |
| KOH (g./l.) | 60 | — | 60 | — | 60 |
| Temperature (°F.) | 180 | 180 | 180 | 200 | 200 |
| Immersion Time (min.) | 5 | 10 | 10 | 30 | 30 |

| Example No. | XIII | XIV | XV | XVI |
|---|---|---|---|---|
| Blackening Solution | | | | |
| $(NH_4)_4P_2O_8$ (g./l.) | 120 | 120 | — | — |
| $Na_4P_2O_8$ (g./l.) | — | — | 100 | 100 |
| NaOH (g./l.) | 60 | — | 60 | — |
| KOH (g./l.) | — | 60 | — | 60 |
| Temperature (°F.) | 200 | 200 | 200 | 200 |
| Immersion Time (min) | 5 | 5 | 5 | 5 |

$a$ In this example the bath was agitated since some precipitation took place during the blackening operation.

What is claimed is:

1. The process of forming an adherent black coating on the surface of a copper or copper alloy article which comprises immersing the surface in a hot solution comprising water, a peroxydiphosphate compound selected from the group consisting of ammonium peroxydiphosphate, an alkali metal peroxydiphosphate and an alkaline earth metal peroxydiphosphate and mixtures thereof, and an alkali metal hydroxide selected from the group consisting of sodium hydroxide and potassium hydroxide and mixtures thereof, said peroxydiphosphate being present in solution at a concentration of at least 5 grams per liter and the ratio of peroxydiphosphate to hydroxide being at least 1:12 on a dry weight basis.

2. The process of claim 1 wherein the temperature of the solution ranges from about 150° to about 210° F.

3. The process of claim 1 wherein the concentration of the said peroxydiphosphate compound is from about 5 to about 120 grams per liter.

4. The process of claim 1 wherein the said peroxydiphosphate compound is potassium peroxydiphosphate.

5. The process of claim 1 wherein the concentration of the alkali metal hydroxide is from about 60 to about 120 grams per liter.

6. The process of claim 1 wherein the alkali metal hydroxide is sodium hydroxide.

7. The process of claim 1 wherein the alkali metal hydroxide is potassium hydroxide.

8. The process of claim 1 wherein the said article is immersed in the hot solution for about 3 to about 30 minutes.

9. The process of claim 1 wherein the said article is immersed for about 3 to about 30 minutes in a solution comprising water, potassium peroxydiphosphate and sodium hydroxide maintained at a temperature of about 150 to about 210° F.

10. The process of claim 1 wherein the said article is immersed for about 3 to about 30 minutes in a solution comprising water, potassium peroxydiphosphate and potassium hydroxide maintained at a temperature of about 150° to about 210° F.

11. An aqueous solution for use in forming an adherent black coating on the surface of a copper or copper alloy article comprising, in addition to water, a peroxydiphosphate compound selected from the group consisting of ammonium peroxydiphosphate, an alkali metal peroxydiphosphate and an alkaline earth metal peroxydiphosphate, and mixtures thereof, and an alkali metal hydroxide selected from the group consisting of sodium hydroxide and potassium hydroxide and mixtures thereof, said peroxydiphosphate being present in solution at a concentration of at least 5 grams per liter and the ratio of peroxydiphosphate to hydroxide being at least 1:12 on a dry weight basis.

12. The aqueous solution of claim 11 wherein the concentration of the peroxydiphosphate compound is from about 5 to about 120 grams per liter and the concentration of the alkali metal hydroxide is about 60 to about 120 grams per liter.

13. The aqueous solution of claim 12 wherein the said peroxydiphosphate compound is potassium peroxydiphosphate.

14. The aqueous solution of claim 11 wherein the alkali metal hydroxide is sodium hydroxide.

15. The aqueous solution of claim 11 wherein the alkali metal hydroxide is potassium hydroxide.

16. A dry composition useful in forming an adherent black coating on the surface of a copper or copper alloy article comprising a peroxydiphosphate compound selected from the group consisting of ammonium peroxydiphosphate, an alkali metal peroxydiphosphate, and an alkaline earth metal peroxydiphosphate, and mixtures thereof, and an alkali metal hydroxide selected from the group consisting of sodium hydroxide and potassium hydroxide, said peroxydiphosphate being present in a weight ratio of from 1:12 to 2:1 relative to said alkali metal hydroxide.

17. The dry composition of claim 16 wherein the said peroxydiphoshpate composition is potassium peroxydiphosphate.

18. The composition of claim 16 wherein the said peroxydiphosphate compound is potassium peroxydiphosphate present in an amount equal to about 66.7 weight percent of the said composition with the balance being sodium hydroxide.

19. The composition of claim 16 wherein the said peroxydiphosphate compound is potassium peroxydiphosphate present in an amount equal to about 50 weight percent of the said composition with the balance being potassium hydroxide.

* * * * *